US007765803B2

(12) United States Patent
Lee et al.

(10) Patent No.: US 7,765,803 B2
(45) Date of Patent: Aug. 3, 2010

(54) CRANKLESS RECIPROCATING STEAM ENGINE

(75) Inventors: Dae-Hee Lee, Busan (KR); Yeong-Saeng Kim, Kyungnam (KR)

(73) Assignee: Inje University Industy-Academic Cooperation Foundation (KR)

( * ) Notice: Subject to any disclaimer, the term of this patent is extended or adjusted under 35 U.S.C. 154(b) by 0 days.

(21) Appl. No.: 11/718,706

(22) PCT Filed: Feb. 27, 2007

(86) PCT No.: PCT/KR2007/001012

§ 371 (c)(1),
(2), (4) Date: May 4, 2007

(87) PCT Pub. No.: WO2008/091033

PCT Pub. Date: Jul. 31, 2008

(65) Prior Publication Data

US 2009/0217904 A1 Sep. 3, 2009

(51) Int. Cl.

| | |
|---|---|
| ***F16D 31/02*** | (2006.01) |
| ***F01L 15/00*** | (2006.01) |
| ***F01L 33/02*** | (2006.01) |
| ***F01L 7/00*** | (2006.01) |

(52) U.S. Cl. ............................. 60/369; 60/370; 60/407; 91/178; 91/180; 123/190.1; 123/190.8

(58) Field of Classification Search .................. 60/369, 60/370, 516–526, 645, 651, 670, 671; 91/178–194; 123/190.1–190.2

See application file for complete search history.

(56) References Cited

U.S. PATENT DOCUMENTS

| | | | | | |
|---|---|---|---|---|---|
| 749,958 | A | * | 1/1904 | Crompton | 91/180 |
| 1,514,280 | A | * | 11/1924 | Girvin | 123/51 AA |
| 3,405,701 | A | * | 10/1968 | Mealin et al. | 123/190.4 |
| 3,581,626 | A | * | 6/1971 | Matthews | 91/180 |
| 4,433,649 | A | * | 2/1984 | Shin | 123/53.1 |
| 5,535,715 | A | * | 7/1996 | Mouton | 123/197.1 |
| 5,953,914 | A | * | 9/1999 | Frangipane | 60/370 |

FOREIGN PATENT DOCUMENTS

JP 2005-331098 * 12/2005

* cited by examiner

*Primary Examiner*—Thomas E. Denion
*Assistant Examiner*—Christopher Jetton
(74) *Attorney, Agent, or Firm*—Park & Associates IP Law LLC

(57) ABSTRACT

We present a high-efficiency crankless reciprocating steam engine that loses only a small amount of energy when the rectilinear motion of its piston is changed into the rotary motion of its driveshaft. The present invention continuously rotates a valve in one direction while alternately introducing steam into two piston housing chambers to generate the rotary force of the driveshaft. Therefore, engine efficiency is greatly increased because the inertial force losses in the valve are much smaller compared to the case when the valve rotation stops or changes direction.

5 Claims, 5 Drawing Sheets

CRANKLESS RECIPROCATING STEAM ENGINE

REFERENCE TO RELATED APPLICATIONS

This is a continuation of pending International Patent Application PCT/KR2007/001012 filed on Feb. 27, 2007, which designates the United States and claims priority of Korean Patent Application No. 10-2007-0007291 filed on Jan. 24, 2007.

FIELD OF THE INVENTION

This invention is a crankless reciprocating steam engine that efficiently changes the rectilinear motion of its piston into the rotary motion of its driveshaft.

BACKGROUND OF THE INVENTION

In general, a reciprocating steam engine produces rectilinear motion in a piston by supplying high-pressure steam to a cylinder. It then changes the rectilinear motion into rotary motion using a crank unit and rotates a driveshaft. A reciprocating steam engine also reverses the rectilinear motion direction of the piston using the inertial force of a flywheel installed at the crank unit, and discharges steam from the cylinder.

However, conventional reciprocating steam engines operating with a crank unit have several drawbacks. First, they cannot efficiently change the rectilinear motion to rotary motion because energy losses occur in the crank unit when the piston direction is reversed. Second, the rotation of the driveshaft pulsates when steam is discharged from the cylinder to the atmosphere. Third, the flywheel increases the engine weight and the crank unit complicates the engine construction.

This application modifies the crankless reciprocating steam engine with double cylinders, described in Japanese Patent Laid-Open No. 2005-331098, to resolve the above drawbacks. In this engine, the rear chambers of two cylinders communicate with each other using a connecting pipe, and high-pressure fluid is alternately introduced into front chambers of both cylinders. When each piston of the two cylinders reciprocates, the two engaged racks alternately reciprocate. A saw-toothed wheel gear, engaged with the two racks, rotates in both directions. Such two-way rotary motion is transmitted to the driveshaft as one-way rotary motion.

In the above construction, when the motion direction of the piston is reversed, the energy losses become much smaller compared to those of a crank unit. Pulsations in the driveshaft rotation can be prevented because steam is discharged from one cylinder due to the steam pressure introduced into the other cylinder. In addition, a reduced engine weight and simplified engine structure can be achieved because the flywheel and crank unit are unnecessary.

The invention disclosed in Japanese Patent Laid-Open No. 2005-331098 provides a rotary diverter valve installed in the high-pressure fluid path as a means of alternately supplying high-pressure fluid to two cylinders. The rotary diverter valve includes a cylindrical valve that rotates freely, two pipes that are inserted into the path for the high-pressure fluid, and two control levers extending in the radial direction of the cylindrical valve. When the two racks alternately reciprocate, a rod installed in each rack reciprocates in engagement with the rack, and alternately presses the two control levers of the rotary diverter valve. The diverter valve rotates in the forward direction when one control lever is pressed, and in the reverse direction when the other control lever is pressed. By alternately changing the rotational position of the valve, the connection state of the two pipes changes. In other words, when the valve is in its first rotational position, high-pressure fluid is introduced into the first cylinder through the first pipe, while at the same time, fluid is discharged from the second cylinder through the second pipe. When the valve is in its second rotational position, high-pressure fluid is introduced into the second cylinder through the second pipe while fluid is discharged from the first cylinder through the first pipe.

The rotary diverter valve alternately changes its rotational direction, interworking with the two alternately reciprocating racks. By changing the rotational direction, all rotation energy in the valve is lost, rather than conserved as an inertial force, resulting in a substantial reduction in engine efficiency.

SUMMARY OF THE INVENTION

The present invention consists of a crankless reciprocating engine that eliminates many of the problems described above that result from the limitations and disadvantages of standard engines.

The object of the present invention is to provide a high-efficiency crankless reciprocating engine by substantially reducing the energy losses that occur when changing the rectilinear motion of a piston to the rotary motion of a driveshaft.

A new crankless reciprocating engine is proposed to resolve the technical problem. The crankless reciprocating engine includes a first piston housing chamber partitioned into a first pressure chamber and a second pressure chamber by the first piston housed therein, a second piston housing chamber partitioned into a third pressure chamber and a fourth pressure chamber by the second piston housed therein, and a communication channel for communicating between the second pressure chamber and the fourth pressure chamber. A first rack reciprocates in engagement with the first piston, a second rack reciprocates in engagement with the second piston, a first pinion engages with the first rack, and a second pinion engages with the second rack. A driveshaft is used to support the first and second pinions, changing the two-way rotation of each pinion into a one-way rotation and transmitting this rotation to a load. A cylindrical valve with at least four fluid channels that pass through the curved surface of its circumference freely rotates on the cylindrical shaft. The engine also contains a power transmission unit to rotate the valve in one direction in engagement with the driveshaft.

When the valve is in its first rotational position, fluid is introduced into the first pressure chamber through the first fluid channel of the valve, while at the same time, fluid is discharged from the third pressure chamber through the fourth fluid channel of the valve. When the valve is in its second rotational position, fluid is introduced into the third pressure chamber through the third fluid channel of the valve while fluid is discharged from the first pressure chamber through the second fluid channel of the valve. Therefore, when the valve is in its first rotational position, fluid is introduced into the first pressure chamber through the first fluid channel, and the first piston moves to expand the first pressure chamber. This forces fluid out from the second pressure chamber and into the fourth pressure chamber through the communication channel, and the second piston moves to contract the third pressure chamber. Accordingly, the fluid in the third pressure chamber is discharged through the fourth fluid channel. The first and second racks move rectilinearly in engagement with the two pistons. This motion causes the pinions to rotate, with the first pinion engaged with the first rack and the second pinion engaged with the second rack. The one-way rotational force is transmitted to a load by the driveshaft, which rotates in one direction, and the one-way rotation force is transmitted to the valve by the power transmission unit. Accordingly, the valve rotates in one direction in its first rotational position.

When the valve rotates up to its second rotational position, fluid is introduced into the third pressure chamber through the third fluid channel, and the second piston moves to expand the third pressure chamber. Fluid is forced out from the fourth pressure chamber and introduced into the second pressure chamber through the communication channel, and the second piston moves to contract the first pressure chamber. Accordingly, the fluid of the first pressure chamber is discharged through the second fluid channel. Both the driveshaft and valve again rotate in the same direction due to the motion of the two pistons. When the valve returns to its first rotational position, fluid is introduced into the first pressure chamber and is discharged from the third pressure chamber, and the process repeats.

The reciprocating engine may contain a valve housing chamber, which includes a first port to introduce fluid into the first fluid channel, a second port to discharge fluid from the second fluid channel, a third port to introduce fluid into the third fluid channel, a fourth port to discharge fluid from the fourth fluid channel, a fifth port to introduce fluid into the first pressure chamber, a sixth port to discharge fluid from the first pressure chamber, a seventh port to introduce fluid into the third pressure chamber, and an eighth port to discharge fluid from the third pressure chamber. When the valve is in its first rotational position, the first fluid channel is inserted between the first port and the fifth port, and the fourth fluid channel is inserted between the eighth port and the fourth port. When the valve is in its second rotational position, the third fluid channel is inserted between the third port and the seventh port, and the second fluid channel is inserted between the sixth port and the second port. If the valve is installed in a housing chamber, the introduction and discharge of fluid is performed through the first to eighth ports. Therefore, the amount of fluid that leaks outside the housing chamber without being introduced into the first or third pressure chambers is reduced.

The reciprocating engine also includes several ring members attached around the valve. These separate the first, third, fifth, and seventh ports, and the second, fourth, sixth, and eighth ports from each other.

In this construction, the direction of the fluid in each channel does not change when the valve counter-rotates because each fluid channel extends vertically from the cylindrical shaft of the valve. When the valve counter-rotates from either its first or second rotational position, it remains in the same state. Because the first and second fluid channels and the third and fourth fluid channels are simultaneously aligned vertically to each other, the valve is in its second rotational position after a quarter rotation from its first rotational position. Thus, if the valve continuously rotates in one direction, the first and second rotational positions are alternately repeated every quarter rotation.

The present invention simultaneously introduces fluid into two piston housing chambers by rotating a valve through which the fluid flows in only one direction, thereby reducing the inertial force losses of the valve and enhancing engine efficiency.

DETAILED DESCRIPTION OF THE INVENTION

In this section, the ideal configuration of the present invention will be described in detail with reference to the accompanying drawings.

Figure 1:
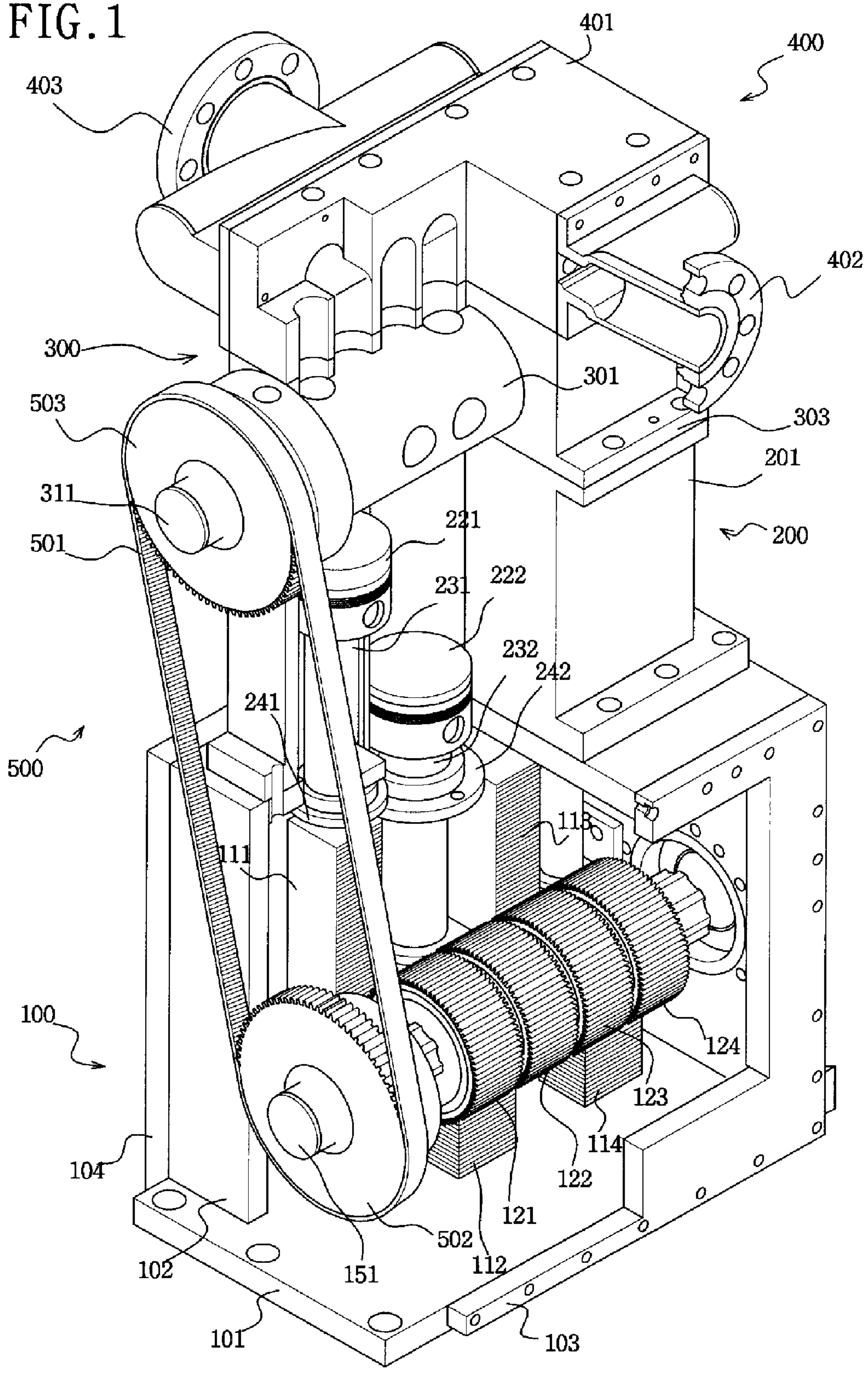
FIG. 1 presents a perspective view illustrating the crankless reciprocating engine.

FIG. 1 illustrates the internal structure of the crankless reciprocating engine. This view was obtained by cutting away part of the engine circumference to aid in the understanding of key parts.

Figure 2:
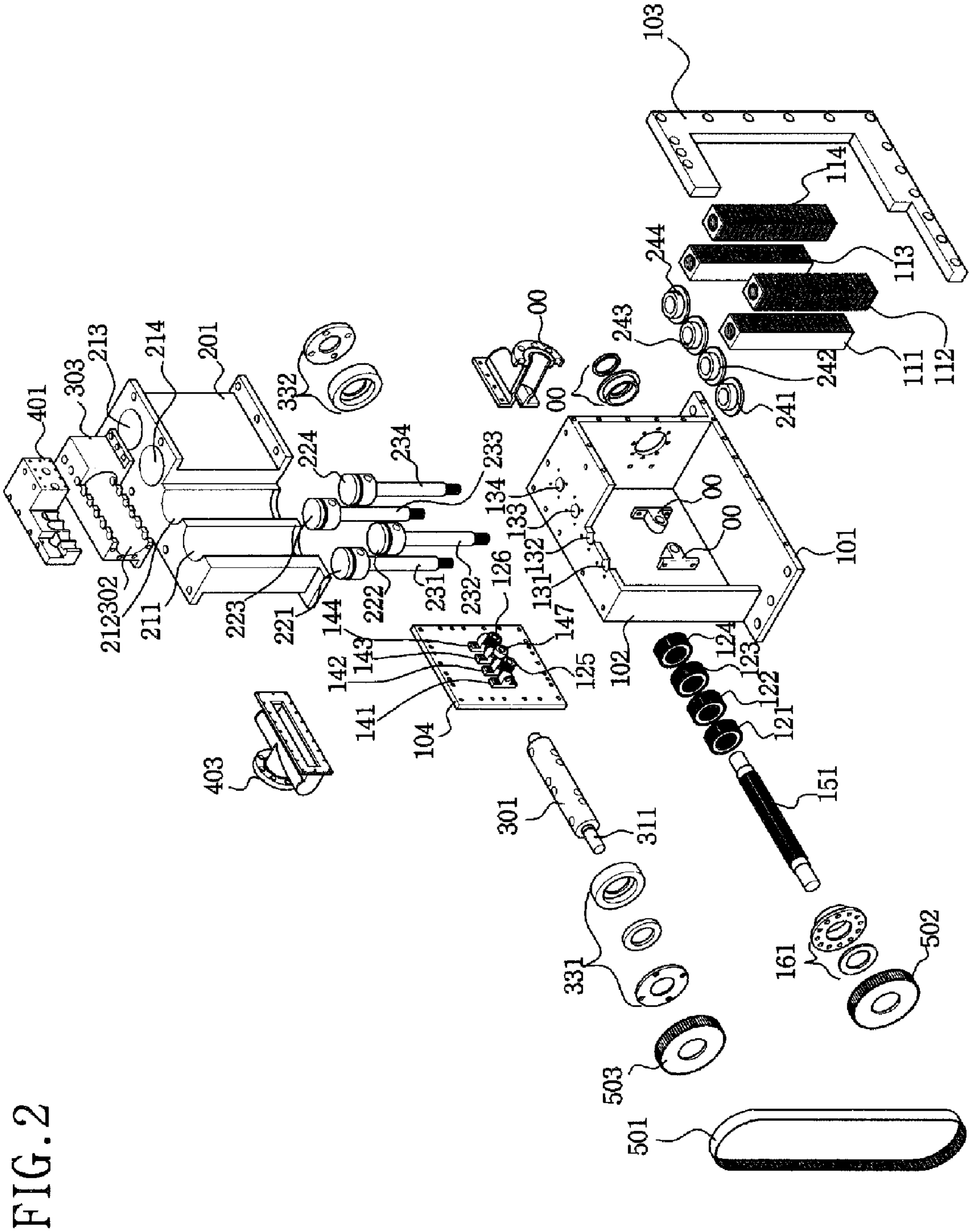
FIG. 2 shows an exploded view of the crankless reciprocating engine shown in FIG. 1.

FIG. 2 shows an exploded view of the crankless reciprocating engine shown in FIG. 1.

Figure 3:
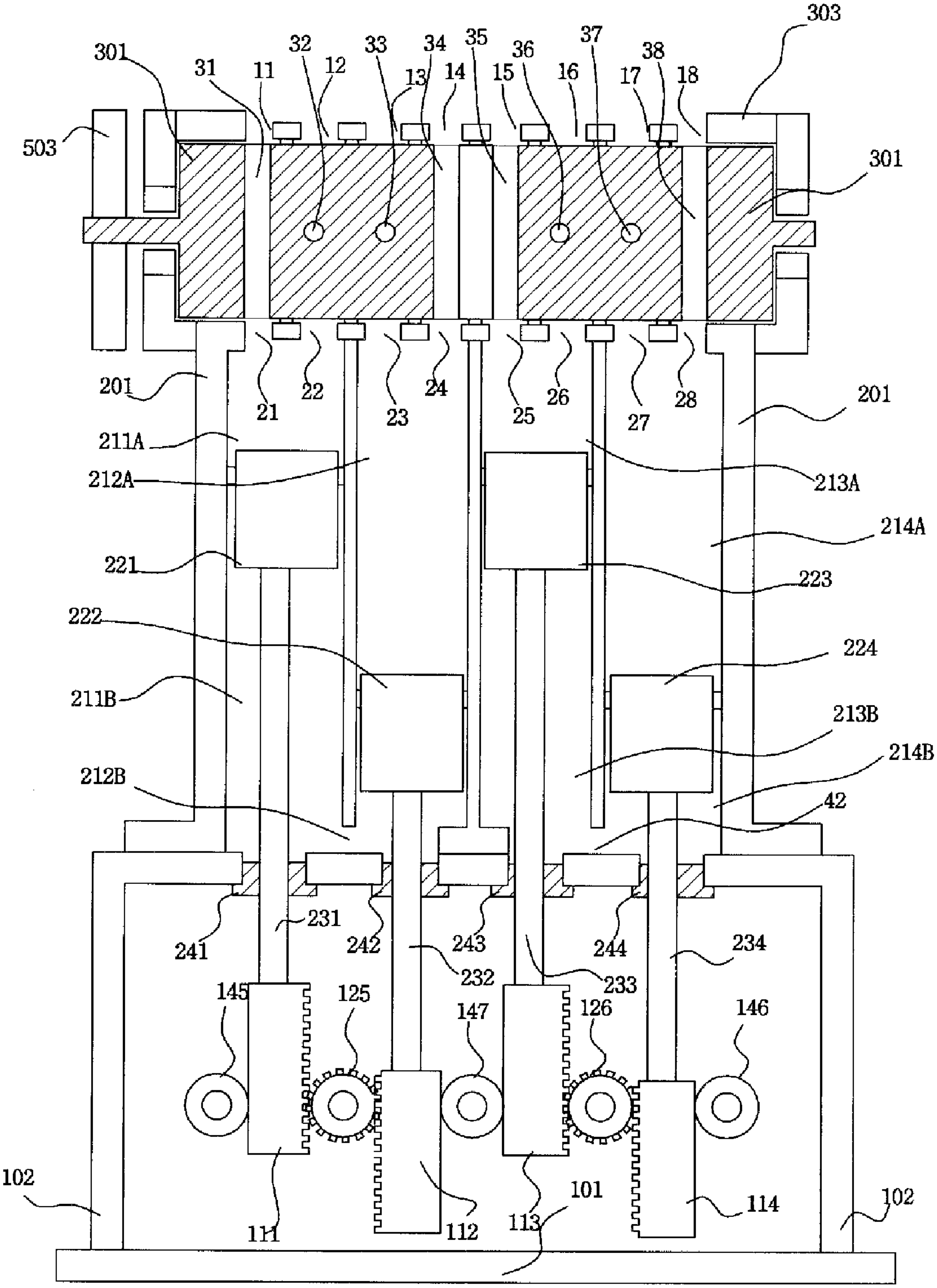
FIG. 3 displays a cross-sectional view of the crankless reciprocating engine shown in FIG. 1.

FIG. 3 shows a cross-sectional view of the crankless reciprocating engine shown in FIG. 1. It illustrates a section of the crankless reciprocating engine taken along the axial line of valve 302 described below. Manifold 400 is omitted for clarity.

Figure 4:
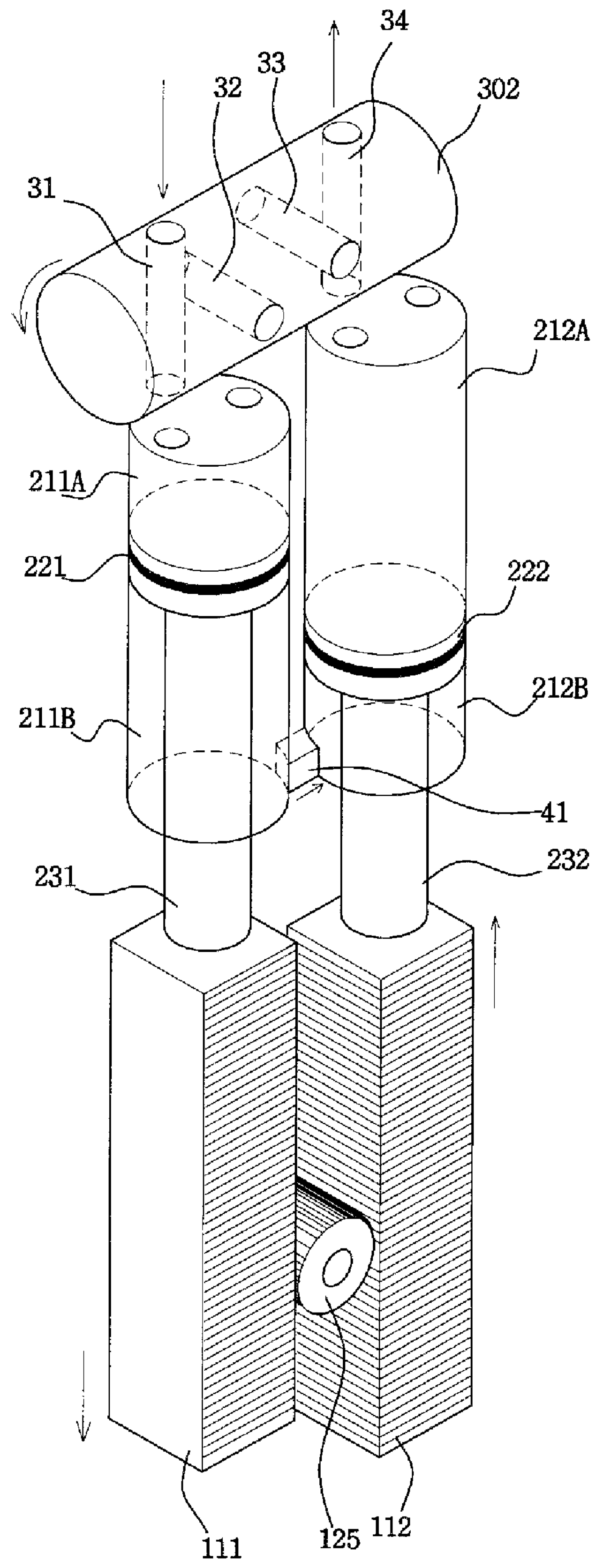
FIG. 4 illustrates key parts of the crankless reciprocating engine shown in FIG. 1.

FIG. 4 illustrates key parts of the crankless reciprocating engine shown in FIG. 1.

Like reference numerals denote like elements in each of the attached drawings.

The crankless reciprocating engine shown in FIG. 1 includes gear 100, cylinder 200, valve 300, manifold 400, and power transmission unit 500. Gear 100 is located below cylinder 200, which in turn is below valve 300 and manifold 400.

<Gear 100>

Gear 100 changes the reciprocating motion of the four pistons (221-224) described below to the one-way rotary motion of driveshaft 151.

As shown in FIG. 2, gear 100 includes frame plate 102, bottom plate 101, and side plates 103 and 104 as box-shaped constituent elements forming an outer wall. Gear 100 also includes racks 111-114, pinions 121-126, driveshaft 151, bearings 161 and 162, and guide rollers 141-147 as constituent elements of a gear unit that changes reciprocating motion to rotary motion.

As shown in FIG. 2, frame plate 102 is bent into an "A"-shape and is fixed to the upper part of bottom plate 101 with the opening of its "A"-shape directed downward. Side plates 102 and 104 are disposed vertically to frame plate 102 and bottom plate 101, and reinforce these plates on both sides. Thus, gear 100 has a rectangular box-shape formed by frame plate 102, bottom plate 101, and side plates 103 and 104.

The "A"-shaped frame plate 102 forms three surfaces of the box-shaped gear 100. The two side surfaces have holes to enable passage of driveshaft 151. Bearings 161 and 162 are fitted into the two holes, and support and freely rotate driveshaft 151 at both ends.

Driveshaft 151 supports pinions 121-124, and changes the two-way rotary motion to the one-way rotation of each pinion. The rotation of driveshaft 151 is transmitted to a load (not shown), such as an electricity generating motor. Driveshaft 151 constructs a one-way clutch bearing to transmit only the one-way rotation of each pinion. To do so, driveshaft 151 rotates gears with the pinion when the pinion rotates in a predetermined direction, such as counterclockwise in FIG. 1. Driveshaft 151 does not gear with the pinion when the pinion rotates in a rearward direction; in this case, the pinion idles without transmitting a rotary force to driveshaft 151.

Racks 111, 112, 113, and 114 engage with pinions 121, 122, 123, and 124, respectively.

In examples shown in FIGS. 1 and 2, racks 111-114 are vertical-lengthwise rectangular bodies. Saw-toothed surfaces are provided on one side of the racks, extending in the vertical direction, and engage with pinions 121-124. The lengthwise reciprocating motion of racks 111-114 engages with and rotates pinions 121-124, respectively.

Racks 111-114 are sequentially arranged in parallel with the axial direction of driveshaft 151. Each rack extends lengthwise vertically to the axial direction of driveshaft 151.

Racks 111 and 112 have saw-toothed side surfaces that are adjacent to each other. These engage with pinion 125, which is fitted between racks 111 and 112 and mutually reciprocates with them in a rearward direction. Similarly, racks 113 and 114 have saw-toothed adjacent side surfaces that engage with pinion 126, which is fitted between them. Pinion 126 mutually reciprocates with racks 113 and 114 in a rearward direction.

Guide rollers 141-147 guide the path of the reciprocating motion of each rack.

Racks 111-114 are fitted between pinions 121-124 and guide rollers 141-144, respectively. Guide rollers 141-144 contact with the side surfaces opposite from the saw-toothed surfaces of racks 111-114. Guide rollers 141-144 regulate the motion of racks 111-114 in a direction separate from driveshaft 151 while rolling on the side surfaces of the racks as they reciprocate. As shown in FIG. 2, guide rollers 111-114 are parallel to side plate 104.

As shown in FIG. 3, guide roller 147 is fitted between the side surfaces of racks 112 and 113. It regulates the motion of the two racks in the horizontal direction (or the axial direction of driveshaft 151) while moving on the side surfaces of the racks as they reciprocate.

Guide roller 145 contacts the surface opposite from the saw-toothed surface of rack 111, which is engaged with pinion 125. Guide roller 145 regulates the motion of rack 111 in a direction separate from the shaft of pinion 125 while moving on the side surface of the rack as it reciprocates. The same applies to guide roller 146, which contacts the surface opposite from the saw-toothed surface of rack 114, which in turn is engaged with pinion 126.

The box-shaped gear 100 has four holes, 131-134, on its upper surface (the surface of the center part of the "A"-shaped frame plate 102) to enable passage of piston rods 231-234, as described below. As shown in FIG. 2, holes 131-134 are parallel to the axial direction of driveshaft 151.

<Cylinder 200>

Cylinder 200 reciprocates pistons 221-224 using high-pressure steam power supplied from valve 300.

As shown in FIGS. 1 and 2, cylinder 200 includes cylinder body 201, which contains cylindrical chambers (piston housing chambers) 211-214, pistons 221-224, piston rods 231-234, and rod guides 241-244.

Cylinder body 201 has an approximate rectangular shape, with a lower surface that is connected to the upper surface of box-shaped gear 100, and an upper surface that is connected to the lower surface of valve housing chamber 303, as described below. Cylinder body 201 has an edge part provided around its lower surface. This edge part has holes to allow for the passage of bolts used to fix cylinder body 201 to box-shaped gear 100. Cylinder body 201 also has an edge part partially provided around its upper surface. This edge part has holes to allow for the passage of bolts used to fix valve housing chamber 303 to cylinder body 201.

As shown in FIG. 1, cylinder chambers 211-214 are used as cylindrical spaces that pass through the upper and lower surfaces of cylinder body 201. Pistons 221-224 are housed in cylinder chambers 211-214, respectively.

Cylinder chamber 211, which is the first piston housing chamber, and cylinder chamber 212, which is the second piston housing chamber, work as a pair in proximity to each other within cylinder body 201. Cylinder chamber 211 is partitioned into upper pressure chamber 211A, which is the first pressure chamber, and lower pressure chamber 211B, which is the second pressure chamber, by piston 221. Similarly, cylinder chamber 212 is partitioned into upper pressure chamber 212A, which is the third pressure chamber, and lower pressure chamber 212B, which is the fourth pressure chamber, by piston 222. Hole 41, which is the communication channel, is provided between the second and fourth pressure chambers, 211B and 212B, allowing them to communicate with each other. As shown in FIG. 3, hole 41 is provided by partially cutting away the barrier between pressure chambers 211B and 212B. The same applies to the third piston housing chamber, 213, and the fourth piston housing chamber, 214, which also work as a pair. The chambers are partitioned by pistons 223 and 224 and use hole 42 as the communication channel, as described above.

Holes 131-134 of box-shaped gear 100 are located under the lower surfaces of cylinder chambers 211-214. Rod guides 241-244 each are fitted into holes 131-134, respectively, and form the lower end wall of cylinder chambers 211-214.

Piston rods 231-234 each connect to the lower surfaces of pistons 221-224, and reciprocate up and down in engagement with the pistons. Rod guides 241-244 guide the up and down reciprocating motion of piston rods 231-234, which pass through box-shaped gear 100 via the rod guides and connect to the ends of racks 111-114, respectively. If piston rods 231-234 reciprocate up and down, racks 111-114 must also reciprocate up and down while engaged with them.

<Valve 300>

Valve 300 alternatively allows the introduction and discharge of high-pressure steam into and from paired cylinder chambers 211 and 212, and 213 and 214. The valve introduces steam into cylinder chamber 211 while discharging steam from cylinder chamber 212, or introduces steam into cylinder chamber 212 while discharging steam from cylinder chamber 211. The valve also introduces steam into cylinder chamber 213 while discharging steam from cylinder chamber 214, or introduces steam into cylinder chamber 214 while discharging steam from cylinder chamber 213.

As shown in FIG. 1, valve 300 consists of cylindrical valve 301, drum 303 with valve housing chamber 302, which houses cylindrical valve 301, and bearings 331 and 332 to support and allow shaft 311 to freely rotate valve 301.

Drum 303 is approximately rectangular, with a lower surface connected to the upper surface of cylinder body 201 and an upper surface connected to the lower surface of duct 401, as described below. The lower surface of drum 303 forms the upper end wall of cylinder chambers 211-214 of cylinder body 201. Drum 303 has an edge part partially provided around its lower surface with holes to allow passage of the bolts used to fix drum 303 to cylinder body 201.

Valve housing chamber 302 is a cylindrical space passing through two facing sides of drum 303. As shown in FIGS. 1 and 2, housing chamber 302 is oriented parallel to driveshaft 151.

Valve 301 freely rotates on its cylindrical shaft as power transmission unit 500, described below, is driven. The valve includes eight fluid channels, 31-38, that pass through the curved surface of its circumference.

Fluid channels 31-34 serve as fluid paths to alternately introduce and discharge steam into and from cylinder chambers 211 and 212. The first fluid channel 31 forms a path to introduce steam into the first pressure chamber 211A, the second fluid channel 32 forms a path to discharge steam from the first pressure chamber 211A, the third fluid channel 33 forms a path to introduce steam into the third pressure chamber 212A, and the fourth fluid channel 34 forms a path to discharge steam from the third pressure chamber 212A. When valve 301 is in its first rotational position, high-pressure steam is introduced from manifold 400 to the first pressure chamber 211A through the first fluid channel 31, while steam is discharged from the third pressure chamber 212A to manifold 400 through the fourth fluid channel 34. When valve 301 is in its second rotational position, high-pressure steam is introduced from manifold 400 to the third pressure chamber 212A through the third fluid channel 33, while steam is discharged from the first pressure chamber 211A to manifold 400 through the second fluid channel 32.

In a similar manner, fluid channels 35-38 serve as fluid paths to alternately introduce and discharge steam into and from cylinder chambers 213 and 214. The first fluid channel 35 forms a path to introduce steam into the first pressure chamber 213A, the second fluid channel 36 forms a path to discharge steam from the first pressure chamber 213A, the third fluid channel 37 forms a path to introduce steam into the third pressure chamber 214A, and the fourth fluid channel 38 forms a path to discharge steam from the third pressure chamber 214A. When valve 301 is in its first rotational position, high-pressure steam is introduced from manifold 400 to the first pressure chamber 213A through the first fluid channel 35, while steam is discharged from the third pressure chamber 214A to manifold 400 through the fourth fluid channel 38. When valve 301 is in its second rotational position, high-pressure steam is introduced from manifold 400 to the third pressure chamber 214A through the third fluid channel 35, while steam is discharged from the first pressure chamber 213A to manifold 400 through the second fluid channel 36.

As shown in FIGS. 3 and 4, fluid channels 31-38 pass vertically through the cylindrical shaft of valve 301. The fluid channel pairs 31 and 32, 33 and 34, 35 and 36, and 37 and 38 each connect to identical pressure chambers 211-214, respectively. The second fluid channel 32 and the third fluid channel 33 are oriented parallel to each other. The second fluid channel 36 and the third fluid channel 37 are also oriented parallel to each other.

As shown in FIGS. 2 and 3, valve housing chamber 302 has eight ports, 11-18, which open for fluid channels 31-38 within duct 401. It also has eight ports, 21-28, which open for the upper end wall of cylinder chambers 211-214. Ports 11-18 are arranged parallel to the axial direction of valve 301 in the upper surface of drum 303. Ports 21-28 are arranged parallel to the axial direction of valve 301 in the lower surface of drum 303.

Ports 11-14 and 21-24 are provided in the fluid channels to introduce steam into or discharge steam from paired cylinder chambers 211 and 212. Ports 11-14 introduce and discharge steam between manifold 400, described below, and fluid channels 31-34. The first port 11 introduces steam into the first fluid channel 31, the second port 12 discharges steam from the second fluid channel 32, the third port 13 introduces steam into the third fluid channel 33, and the fourth port 14 discharges steam from the fourth fluid channel 34. Ports 21-24 introduce and discharge steam between fluid channels 31-34 and the first pressure chamber 211A or the third pressure chamber 212A. The fifth port 21 introduces steam into the first pressure chamber 211A, the sixth port 22 discharges steam from the first pressure chamber 211A, the seventh port 23 introduces steam into the third pressure chamber 212A, and the eighth port 24 discharges steam from the third pressure chamber 212A. When valve 301 is in its first rotational position, the first fluid channel 31 is inserted between the first port 11 and the fifth port 21, and the fourth fluid channel 34 is inserted between the eighth port 24 and the fourth port 14. When the valve is in its second rotational position, the third fluid channel 33 is inserted between the third port 13 and the seventh port 23, and the second fluid channel 32 is inserted between the sixth port 22 and the second port 12.

Similarly, ports 15-18 and 25-28 are provided in the fluid channels to introduce steam into or discharge steam from paired cylinder chambers 213 and 214. Ports 15-18 introduce and discharge steam between manifold 400, described below, and fluid channels 35-38. The first port 15 introduces steam into the first fluid channel 35, the second port 16 discharges steam from the second fluid channel 36, the third port 13 introduces steam into the third fluid channel 37, and the fourth port 18 discharges steam from the fourth fluid channel 38. Ports 25-28 introduce and discharge steam between fluid channels 35-38 and the first pressure chamber 213A or the third pressure chamber 214A. The fifth port 25 introduces steam into the first pressure chamber 213A, the sixth port 26 discharges steam from the first pressure chamber 213A, the seventh port 27 introduces steam into the third pressure chamber 214A, and the eighth port 28 discharges steam from the third pressure chamber 214A. When valve 301 is in its first rotational position, the first fluid channel 35 is inserted between the first port 15 and the fifth port 25, and the fourth fluid channel 38 is inserted between the eighth port 28 and the fourth port 18. When the valve is in its second rotational position, the third fluid channel 37 is inserted between the third port 17 and the seventh port 27, and the second fluid channel 36 is inserted between the sixth port 26 and the second port 16.

Bearings 331 and 332 close openings in both sides of valve housing chamber 302 provided in drum 303 while freely supporting the small-diameter shaft 311 installed in the axial direction of valve 301.

<Manifold 400>

Manifold 400 introduces high-pressure steam through the first common pipe 402 and distributes the steam to ports 11, 13, 15, and 17 of valve 300. The manifold collects from the second common pipe 403 steam discharged from ports 12, 14, 16, and 18 of valve 300.

As shown in FIG. 1, manifold 400 consists of the first pipe 402 to introduce the high-pressure steam, the second pipe 403 to discharge steam, and duct 401.

As shown in FIGS. 1 and 2, duct 401 is rectangular and is connected at its lower surface to the upper surface of drum 303. Duct 401 has two lateral surfaces extending parallel to the direction of valve 301, and is connected on one side to the first pipe 402 and on the other side to the second pipe 403.

Duct 401 includes four ducts to connect ports 11, 13, 15, and 17 of valve housing chamber 302 to the first pipe 402, and four ducts to connecting ports 12, 14, 16, and 18 to the second pipe 403. Each duct extends vertically toward the upper surface of duct 401 from a connection part that is attached to each port. Each duct is bent into an “L”-shape at the center of duct 401, and extends horizontally toward the lateral first or second pipe 402 or 403.

<Power Transmission Unit 500>

Power transmission unit 500 rotates valve 301 in one direction in engagement with driveshaft 151 of gear 100.

As shown in FIG. 1, power transmission unit 500 includes a first pulley 502, which rotates in engagement with driveshaft 151; a second pulley 503, which rotates in engagement with shaft 301 of valve 301; and a timing belt 501 wound between both pulleys.

The operation of the above reciprocating engine will be described below.

The reciprocating engine is an assembly of independent two-engine systems associated with the two sets of paired cylinder chambers 211 and 212, and 213 and 214. Each engine system generates a rotary force in driveshaft 151 by the same operation. Thus, only a description of the engine system associated with cylinder chambers 211 and 212 will be provided.

First, the state illustrated in FIGS. 3 and 4, where valve 301 is in its first rotational position, will be described. In valve 300, ports 11 and 21 communicate with each other through fluid channel 31 while ports 14 and 24 communicate with each other through fluid channel 34. Thus, high-pressure steam is introduced from manifold 400 to pressure chamber 211A through fluid channel 31 so that piston 221 advances to expand pressure chamber 211A. When piston 221 advances downward, fluid (air or oil) in pressure chamber 211B is introduced into pressure chamber 212B through hole 41 and presses piston 222 upward. As rack 111 advances downward in engagement with piston 221, pinion 125 rotates counterclockwise, as shown in FIG. 3, and the resulting force acts to move rack 112 upward so that piston 222 is pressed upward. If piston 222 advances upward under the force, steam is discharged from pressure chamber 212A to manifold 400 through fluid channel 34. When rack 111 moves downward while rack 112 advances upward simultaneously, pinion 121 rotates counterclockwise, as shown in FIG. 1, and pinion 122 rotates clockwise. Driveshaft 151 gears with pinion 121 rotating counterclockwise but does not gear with pinion 122 rotating clockwise. Therefore, the force advancing rack 111 downward is transmitted to driveshaft 151 via pinion 121 and rotates driveshaft 151 in a counterclockwise direction. Pinion 122 rotating clockwise idles without transmitting power to driveshaft 151. If driveshaft 151 rotates counterclockwise, its rotary force is transmitted to valve 301 through power transmission unit 500, and valve 301 rotates counterclockwise, as shown in FIG. 4.

When valve 301 rotates from its first rotational position to its second rotational position by a quarter turn, ports 21 and 22 communicate with each other through fluid channel 32, while simultaneously, ports 13 and 23 communicate with each other through fluid channel 33 in valve 300. Accordingly, fluid is introduced from manifold 400 to pressure chamber 212A through fluid channel 33, and piston 222 advances downward. If piston 222 moves downward, fluid in pressure chamber 212B is introduced into pressure chamber 211B through hole 41, pressing piston 221 upward. As rack 112 advances downward in engagement with piston 222, pinion 125 rotates clockwise, as shown in FIG. 3, and the resulting force acts to move rack 111 upward so that piston 221 is pressed upward. If piston 221 advances upward under the force, steam is discharged from pressure chamber 211A to manifold 400 through fluid channel 32. When rack 112 moves downward, while rack 111 advances upward simultaneously, pinion 121 rotates clockwise, as shown in FIG. 1, and pinion 122 rotates counterclockwise. In this case, the force advancing rack 112 downward is transmitted to driveshaft 151 via pinion 122, rotating driveshaft 151 in a counterclockwise direction. Pinion 121 rotating clockwise idles without transmitting power to driveshaft 151. If driveshaft 151 rotates counterclockwise, its rotary force is transmitted to valve 301 through power transmission unit 500, and valve 301 rotates counterclockwise.

As valve 301 rotates another quarter turn from its second rotational position to its first rotational position, the above operation is repeated and driveshaft 151 rotates counterclockwise as valve 301 rotates counterclockwise.

As described above, cylindrical valve 301, with fluid channels 31-34 passing through its curved circumference, rotates in one direction in engagement with driveshaft 151. When valve 301 is in its first rotational position, high-pressure steam is introduced into pressure chamber 211A via fluid channel 31 while steam is simultaneously discharged from pressure chamber 212A via fluid channel 34. When valve 301 is in its second rotational position, high-pressure steam is introduced into pressure chamber 212A via fluid channel 33, while steam is simultaneously discharged from pressure chamber 211A via fluid channel 32. When the introduction and discharge of steam into and from pressure chambers 211A and 212A are alternately implemented by the operation of valve 301, pistons 221 and 222 reciprocate. The reciprocating motion of pistons 221 and 222 results in the reciprocating motion of racks 111 and 112 and the rotary motion of pinions 221 and 222. Thus, the reciprocating motion is changed into two-way rotary motion by racks 111 and 112 and pinions 121 and 122. As valve 301 keeps rotating in one direction, steam is alternately introduced into two piston housing chambers 211 and 212, generating the rotary force of driveshaft 151. Therefore, the inertial force of the valve is not lost, enhancing the engine efficiency over that of designs in which the valve stops rotating or changes its rotational direction.

Valve 301 is housed in valve housing chamber 302, which includes ports 11-14 and 21-24 to introduce and discharge fluid. When valve 301 is in its first rotational position, fluid channel 31 is inserted between ports 11 and 21, and fluid channel 34 is inserted between ports 14 and 24. When valve 301 is in its second rotational position, fluid channel 33 is inserted between ports 13 and 23, and fluid channel 22 is inserted between ports 12 and 22. Thus, the introduction and discharge of steam via ports 11-14 and 21-24 is implemented with valve 301 housed in valve housing chamber 302. The amount of steam leaking outside the housing chamber that is not introduced into pressure chamber 211A or 212A is reduced, enhancing the engine efficiency.

Fluid channels 31-34 pass through valve 301 in a direction vertical to the cylindrical shaft. Fluid channels 31 and 32 extend vertically to each other, as do fluid channels 33 and 34. Because each fluid channel extends in the direction vertical to the cylindrical shaft of valve 301, the direction of each fluid channel is consistent with the rotational direction before valve 301 starts to counter-rotate. When valve 301 counter-rotates from its first or second rotational position, it remains in the same state. Because fluid channels 31 and 32 are disposed vertically to each other at the same time as fluid channels 33 and 34 are also disposed vertically to each other, valve 301 is in its second rotational position after a quarter rotation from its first rotational position. Accordingly, if valve 301 continuously rotates in one direction, the first and second rotational positions are alternately repeated every quarter rotation.

By providing fluid channels 31-34 of the valve, as described above, the introduction and discharge of steam into and from the two cylinder chambers 211 and 212 can be implemented when driveshaft 151 rotates at a predetermined speed. Accordingly, the rotary force of driveshaft 151 can be generated uniformly. The present invention can be modified from the described ideal configuration without limitation.

Figure 5:
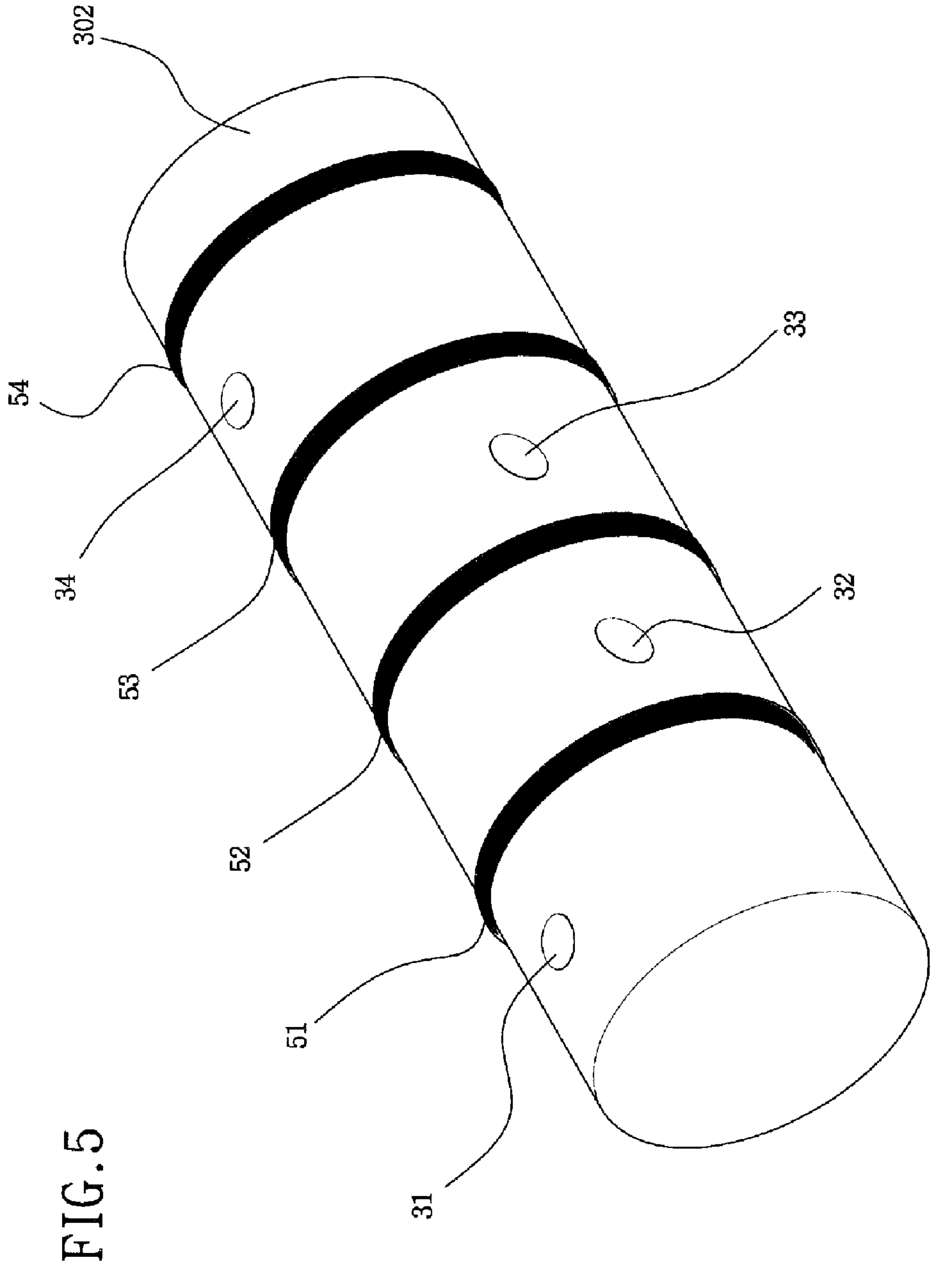
FIG. 5 illustrates the ring members attached around the cylindrical valve.

As shown in FIG. 5, ring members 51-54 can be attached around valve 301 to separate the fluid paths from each other. Ring member 51 is attached between fluid channels 31 and 32, separating ports 11 and 21, which introduce steam, from ports 12 and 22, which discharge steam, within valve housing chamber 302. Ring member 52 is attached between the fluid channels 32 and 33, separating ports 12 and 22, which discharge steam, from ports 13 and 23, which introduce steam. Ring member 53 is attached between fluid channels 33 and 34, separating ports 13 and 23, which introduce steam, from ports 14 and 24, which discharge steam. Finally, ring member 54 is attached between fluid channels 34 and 35, separating ports 14 and 24, which discharge steam, from ports 15 and 25, which introduce steam. Although not shown, ring members can also be attached between fluid channels 35-38. By separating the steam introduction paths from the steam discharge paths, the ring members suppress the reduction of steam pressure and enhance the energy efficiency.

The above description provides an example in which steam is used as the fluid introduced into the cylinder, but the present invention can be realized with any fluid, for example, oil or air. The above example consists of a combination of two engine systems (four cylinders). However, a combination of three engine systems could also be used, as well as a single engine system.

INDUSTRIAL APPLICABILITY

In the present invention, fluid is mutually introduced into two piston housing chambers by rotating a valve located in the path of a fluid that only flows in one direction, thereby reducing the inertial force losses in the valve and enhancing engine efficiency.

While the present invention has been described and illustrated with reference to the preferred configuration, various modifications and variations can be made without departing from the spirit and scope of the invention. We intend for the present application to cover the modifications and variations of this invention that occur within the scope of the appended claims and their equivalents.

What is claimed is:

1. A crankless reciprocating engine comprising:

a first piston housing chamber partitioned into a first pressure chamber and a second pressure chamber by the first piston housed therein;

a second piston housing chamber partitioned into a third pressure chamber and a fourth pressure chamber by the second piston housed therein;

a communication channel for communicating between the second and fourth pressure chambers;

a first rack reciprocating in engagement with the first piston;

a second rack reciprocating in engagement with the second piston;

a first pinion engaging with the first rack;

a second pinion engaging with the second rack;

a driveshaft supporting the first and second pinions, changing the two-way rotation of each pinion into a one-way rotation and transmitting the one-way rotation to a load;

a cylindrical valve with at least four fluid channels passing through the curved surface of its circumference and freely rotating on its cylindrical shaft; and a power transmission unit for rotating the valve in one direction in engagement with the driveshaft, wherein when the valve is in its first rotational position, fluid is introduced into the first pressure chamber through the first fluid channel of the valve while simultaneously fluid is discharged from the third pressure chamber through the fourth fluid channel of the valve, and when the valve is in its second rotational position, fluid is introduced into the third pressure chamber through the third fluid channel of the valve, while simultaneously, fluid is discharged from the first pressure chamber through the second fluid channel of the valve.

2. The reciprocating engine of claim 1, further comprising a valve housing chamber containing:

a first port for introducing fluid into the first fluid channel;

a second port for discharging fluid from the second fluid channel;

a third port for introducing fluid into the third fluid channel;

a fourth port for discharging fluid from the fourth fluid channel;

a fifth port for introducing fluid into the first pressure chamber;

a sixth port for discharging fluid from the first pressure chamber;

a seventh port for introducing fluid into the third pressure chamber; and an eighth port for discharging fluid from the third pressure chamber, wherein when the valve is in its first rotational position, the first fluid channel is inserted between the first port and the fifth port, and the fourth fluid channel is inserted between the eighth port and the fourth port, and when the valve is in its second rotational position, the third fluid channel is inserted between the third port and the seventh port, and the second fluid channel is inserted between the sixth port and the second port.

3. The reciprocating engine of claim 2, further comprising several ring members attached around the valve, separating the first, third, fifth, and seventh ports from the second, fourth, sixth, and eighth ports.

4. The reciprocating engine of claim 1, wherein each of the four fluid channels passes through the valve in a direction vertical to its cylindrical shaft, the first fluid channel and the second fluid channel extend vertically to each other, while the third fluid channel and the fourth fluid channel also extend vertically to each other.

5. The reciprocating engine of claim 2, wherein each of the four fluid channels passes through the valve in a direction vertical to its cylindrical shaft, the first fluid channel and the second fluid channel extend vertically to each other, while the third fluid channel and the fourth fluid channel also extend vertically to each other.

* * * * *